United States Patent [19]

Gough

[11] 3,819,354

[45] June 25, 1974

[54] TOBACCO SUCKER CONTROL WITH DIALKYL 1,2,5-THIADIAZOL-3-YL PHOSPHATES

[75] Inventor: Stanley T. D. Gough, Branchburg, N.J.

[73] Assignee: Mobil Oil Corporation, New York, N.Y.

[22] Filed: Feb. 26, 1973

[21] Appl. No.: 335,993

[52] U.S. Cl............................................ 71/78, 71/87
[51] Int. Cl.................................................. A01n 9/36
[58] Field of Search.................................... 71/78, 87

[56] References Cited
UNITED STATES PATENTS
3,666,768    5/1972    Barker et al......................... 260/302

3,759,688    9/1973    Downing................................ 71/71

Primary Examiner—Lewis Gotts
Assistant Examiner—Catherine L. Mills
Attorney, Agent, or Firm—Andrew L. Gaboriault; Hastings S. Trigg; Mitchell G. Condos

[57] ABSTRACT

The growth of tobacco axillary shoots (suckers) is controlled by contacting them with a growth controlling amount of a di($C_1$-$C_5$) alkyl 1,2,5-thiadiazol-3-yl phosphate.

2 Claims, No Drawings

TOBACCO SUCKER CONTROL WITH DIALKYL 1,2,5-THIADIAZOL-3-YL PHOSPHATES

BACKGROUND OF THE INVENTION

1. Field of the Invention

This invention is directed to a method for chemical control of tobacco axillary shoots (suckers).

2. Description of the Prior Art

Tobacco plants are topped at predetermined stages of growth. The purpose of topping or breaking out the terminal bud of tobacco is to redirect, toward increased leaf development, energies of the plant that would go to formation of the seed head. Topping tends to induce increased growth of the remaining leaves, causes thickening, increases the body and nicotine content and may produce darker colors by preventing development of the seed head and reducing the number of leaves on the stalk.

The usual effects of topping are largely lost, however, if the suckers or shoots appearing in the leaf axils are allowed to develop. If they are not removed, or controlled in some other manner, too much of the plant energy will be sapped, with the result that low quality leaves will be produced over the whole plant.

There are three widely known methods for controlling tobacco suckers. The oldest, one still practiced in certain areas, is the manual separation of the sucker from the leaf axil. This method is slow, laborious, and highly ineffective. As a rule, if control is to be maintained a field will have to be gone over repeatedly at intervals of about a week to remove the suckers as they redevelop.

Another method depends upon the use of certain oils (such as spent motor oils) to control the growth of suckers. The commonly used oils, if used improperly, will cause severe crop losses. Their use can result in extensive burning and/or rotting of the tobacco plant, leading to complete destruction of the plant from these effects alone, or their use can lead to localized burning and/or rotting. Localized destruction of plant tissue from these effects is not in itself fatal to the leaf products, but plant resistance can be weakened, thereby favoring the entry of bacteria or other plant-destroying agents.

For chemical control, liquids containing maleic hydrazide derivatives (U.S. Pat. No. 2,805,926) have been sprayed effectively as systemic agents for the control of suckers on much of the domestic tobacco crop. It has been found, however, that these agents should not be applied until tobacco flowers reach the late bloom stage, in order to avoid retarding the growth of the leaves. This involves a loss in quality and approximately 25 pounds less yield per acre for every day the topping of tobacco is delayed beyond the early flower stage. The systemic agent acts within the plant system, and the timing of its application is critical because all parts of the plant are affected by it.

The phosphate esters utilizable in the method of this invention to control the growth of tobacco axillary shoots have been disclosed as insecticides in U.S. Pat. No. 3,666,768. This patent, however, does not disclose the tobacco axillary shoot control activity of these compounds.

SUMMARY OF THE INVENTION

This invention provides a method of controlling the growth of axillary shoots of a tobacco plant which comprises contacting said shoots with a growth controlling amount of a compound having the formula

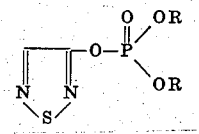

wherein R is alkyl ($C_1$–$C_5$).

DESCRIPTION OF SPECIFIC EMBODIMENTS

It is the discovery of this invention that topped tobacco plants can be treated (as by spraying) with the hereindescribed dialkyl 1,2,5-thiadiazol-3-yl phosphates with the result that tobacco axillary shoot growth is controlled. These phosphates are effective when applied in growth controlling amounts of between about 0.5 and about 10 lbs. per acre, but it is to be understood that these figures do not represent either maximum or minimum limits. The phosphate (axillary shoot control agent) is applied to the topped tobacco plant 1 to 14 days after topping, preferably while in the button stage, i.e., before the remaining flowers are opened.

Improved, very efficient axillary shoot control compositions are obtained when oil-in-water emulsions of solutions of the phosphates in oil are prepared. The word "oil" is used here to designate any liquid which is a solvent for the phosphate utilizable in this invention and is insoluble in water, such as xylene, kerosene, diesel oil, benzene, carbon tetrachloride, ether, heptane, heavy mineral oils, and water insoluble solutions of water-soluble liquids in water insoluble liquids such as a solution of ethyl alcohol in kerosene. The emulsions may be obtained by first dissolving the axillary shoot control agent in the oil and then mixing the resulting solution with water in the presence of an emulsifying agent. In actual commercial sale and application, the axillary shoot control agents are dissolved in the oil solvent and the emulsifier is added to the solution. In the field this mixture of active ingredient, oil and emulsifier is mixed with water before actual application to the tobacco plant. Any of the many methods of spray application may be employed, preferably to provide run-off from the stem to the soil surface.

Emulsifying agents customarily used in the art for the preparation of oil-in-water emulsions are operable in the practice of this invention, e.g., ionic or non-ionic emulsifying or dispersing agents such as the long-chain alkyl-benzene-sulfonates or polyglycol ethers. Such emulsifying agents are normally employed in only very small concentrations, for example, in a quantity up to about 0.3 percent by weight based on the weight of the emulsion. However, it is possible to use any amount of emulsifying agent up to a quantity which would be detrimental to the tobacco plant. Some emulsifiers show phytotoxic reactions when used on living plants. Concentrations of emulsifier up to about 5 percent by weight do not normally damage healthy tobacco plants. Such emulsifiers do not affect the chemical stability or shoot control activity of the axillary shoot control agents.

While the compounds are advantageously used for axillary shoot control when formulated into oil-in-water emulsions, they may also be dissolved in organic solvents or so-called oils as mentioned above, and such solutions applied directly onto the tobacco plants. In formulations, such as the latter, a wetting agent is sometimes required. They may also be mixed with solid carriers such as clay, talc, pumice, and bentonite and then dusted onto the tobacco plants. While all these methods of application are operable, the oil-in-water emulsions and the solutions of the compounds in oil are preferred. The emulsions tend to adhere easily to the plant foliage and are very readily applied by conventional spray methods. The preferred methods of application require less of the active ingredient to give comparable axillary shoot control efficiency than do any of the other methods of application referred to above.

The compounds used in the method of this invention are readily prepared by reacting an alkali metal (Na, K, Li) salt of 3-hydroxy-1,2,5-thiadiazole with a di($C_1$–$C_5$) alkyl phosphorochloridate.

3-Hydroxy-1,2,5-thiadiazole can be prepared by reacting glycinamide hydrochloride with a molar excess (ca. 50 percent) of sulfur monochloride ($S_2Cl_2$) using a suitable solvent, such as dimethyl formamide. It is preferable to use about 10–15 moles of dimethyl formamide per mole of glycinamide hydrochloride. Reaction temperatures of 5°–20°C. can be used, with a reaction time of about 4 hours. After reaction, the reaction mixture is quenched in an equal weight of ice water and sulfur is removed, as by filtration. The 3-hydroxy-1,2,5-thiadiazole product can be isolated by extraction with diethyl ether followed by evaporation of the ether.

EXAMPLE 1

Diethyl 1,2,5-thiadiazol-3-yl phosphate

An aqueous solution (15 ml.) of potassium carbonate (4.8g., 35 mmole) was added to 3-hydroxy-1,2,5-thiadiazole (7.0 g., 69 mmole) slurried in benzene (250 ml.). The water was removed as the azeotrope and collected in a Dean-Stark trap, Diethylphosphorochloridate (10.9 g., 62 mmole) was then added and the reaction mixture refluxed 16 hours. The consumption of diethyl phosphorochloridate was confirmed by vapor phase chromatography. The cooled reaction mixture was filtered, washed twice with water (100 ml.) and dried over sodium sulfate. Evaporation of the solvent yielded 1,2,5-thiadiazol-3-yl diethyl phosphate, a pale yellow oil (8.3 g.). The structure was supported by its NMR spectrum (neat), exhibiting multiplets centered at δ 1.12 (6H) and δ 4.10 (4H) and a sharp singlet at δ 8.35 (1H).

EXAMPLE 2

Dimethyl 1,2,5-thiadiazol-3-yl phosphate

Using the procedure of Example 1, except that dimethyl phosphorochloridate was used instead of diethyl phosphorochloridate, dimethyl 1,2,5-thiadiazol-3-yl phosphate was prepared.

Axillary Shoot (Sucker) Control

Six tobacco plants (variety Xanthi-NC) were topped. Three plants were left untreated as a control group. Two days later, the other three plants were treated with the compound of Example 2, in a concentration of 0.25 percent by weight in an aqueous emulsion. This emulsion was prepared from 0.523 ml. of an emulsifiable concentrate and 49.5 ml. of water. The emulsifiable concentrate contained, by weight, 25 percent dimethyl 1,2,5-thiadiazole-3-yl phosphate, 67 percent xylene, and 8 percent emulsifier (blend of anionic and nonionic surfactants amine dodecylbenzene sulfonate and polyoxyethylene condensate of $C_9$ phenol). Treatment was by spraying to provide run-off from the stem to the soil surface.

Sucker control was determined 11 days after treatment by removing suckers from the three plants in each group and weighing them. The three plants in the control group showed 8.2 g. of suckers. The three plants in the treated group showed 4.4 g. of suckers, about 46 percent control.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A method of controlling the growth of axillary shoots of a tobacco plant which comprises contacting said shoots with a growth controlling amount of a compound having the formula

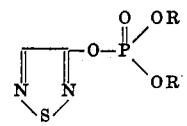

wherein R is alkyl ($C_1$–$C_5$).

2. The method of claim 1, wherein said compound is dimethyl 1,2,5-thiadiazol-3-yl phosphate.